June 15, 1965 R. TOWNSEND 3,189,894

BINARY-TO-DECIMAL CONVERTER

Filed June 22, 1962 2 Sheets-Sheet 1

INVENTOR
RALPH TOWNSEND

BY [signature]

ATTORNEY

INVENTOR
RALPH TOWNSEND
BY
[signature]
ATTORNEY

United States Patent Office 3,189,894
Patented June 15, 1965

3,189,894

BINARY-TO-DECIMAL CONVERTER

Ralph Townsend, Darien, Conn., assignor to American Machine & Foundry Company, a corporation of New Jersey Filed June 22, 1962, Ser. No. 204,555
10 Claims. (Cl. 340—347)

The invention relates to data processing systems and particularly to a system for converting data or other information in one form to another form, such as a binary-to-decimal information conversion system.

A general object of the invention is to convert information in one form of numerical notation to another more convenient form of numerical notation.

A more specific object is to translate efficiently and economically binary-coded information into a train of pulses which is the correct decimal equivalent of the binary-coded information.

A related object is to convert numbers in binary-coded form to equivalent decimal pulse form.

These objects are attained in accordance with the invention by a conversion circuit comprising basically in combination with a source of binary-coded signals representing different digits of a number to be converted into decimal form: a generator for continuously generating a series of equal pulses; a normally-disabled output gate connecting the output of the generator to an output line; a plurality of series-connected binary counters; and control means including a plurality of other gates and one or more flip-flops, responsive to a starting pulse initiating a conversion cycle to effectively cause the binary signals representing the number to be converted, or the complement thereof, to be entered into the counters, to open the output gate to allow a train of pulses from the associated pulse generator to be transmitted to the output line and to the series-connected counters causing them to count the pulses in the train until all of the binary counters therein reach the same output condition, and responsive to that condition to inhibit the output gate stopping the flow of the train of pulses to the output line and to the counters. The number of pulses in the train for the conversion cycle counted by the counters and entering the output line represent the binary number applied to the input of the converter, in decimal form.

Figure 1:
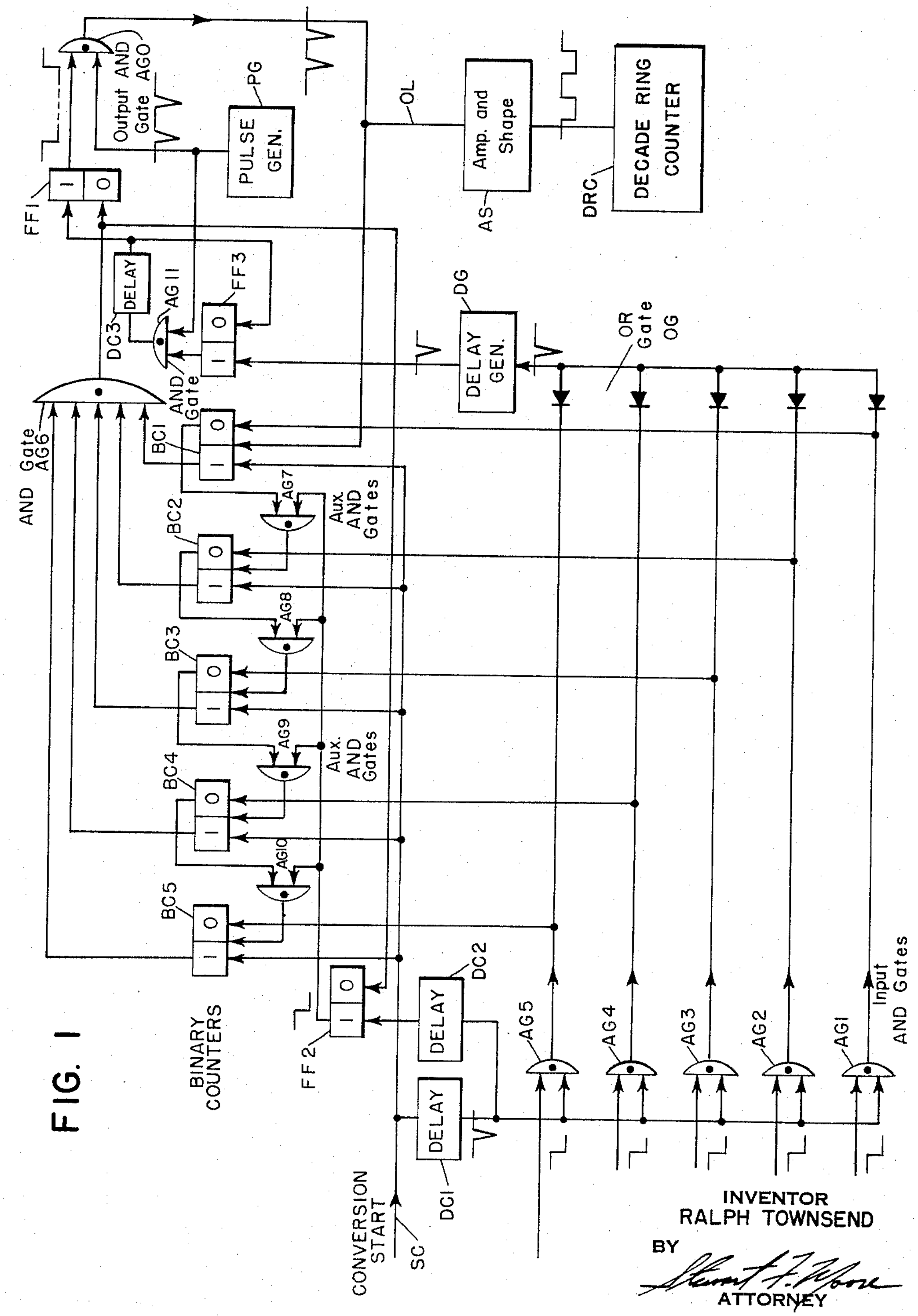
Figure 2:
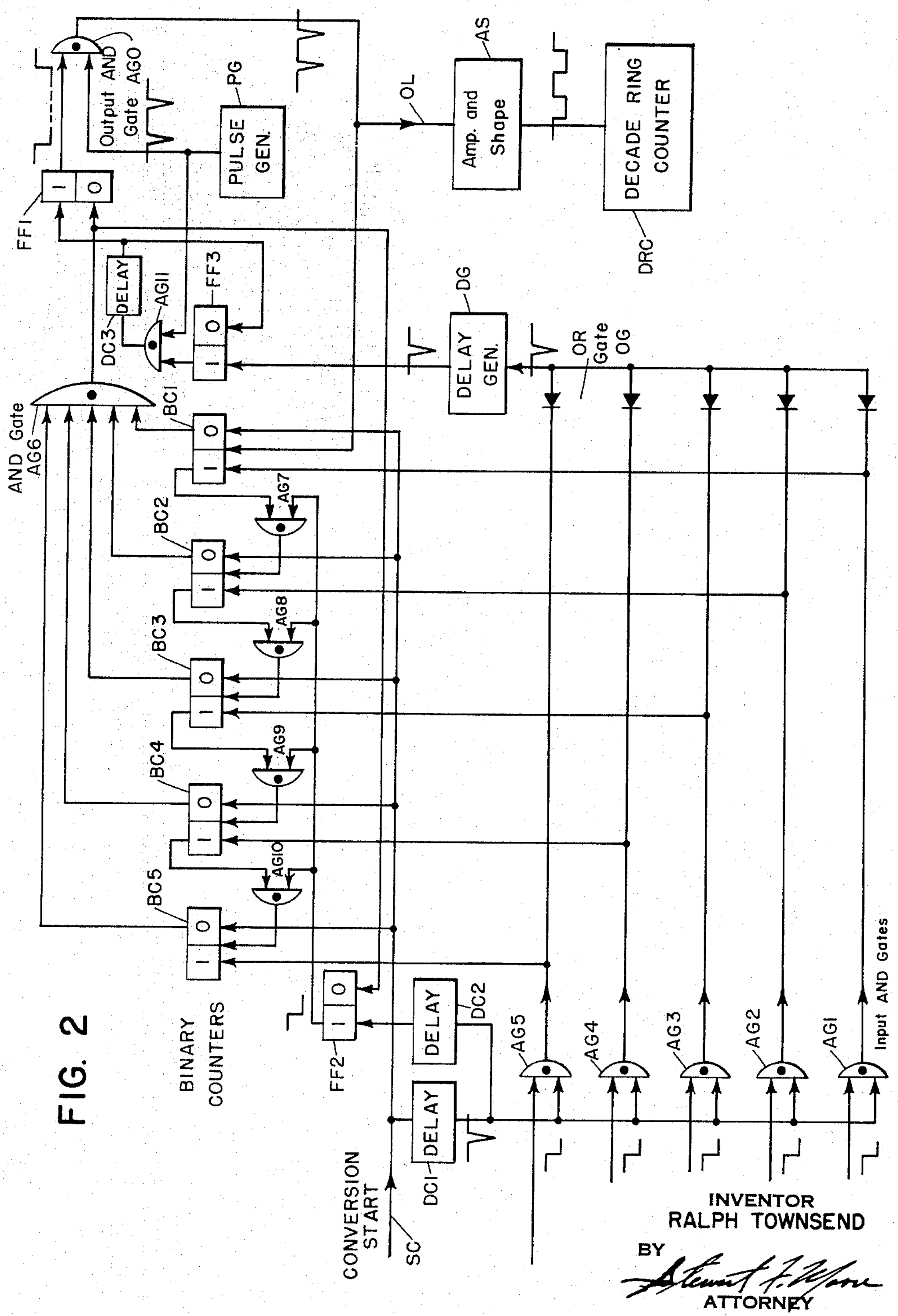

The various features and objects of the invention will be better understood from the following detailed description thereof when it is read in conjunction with the accompanying drawings in which:

FIGS. 1 and 2 show in block schematic form two different embodiments of the invention.

A brief description of the main apparatus elements used in the block diagrams of FIGS. 1 and 2 may be helpful.

As is well known, a flip-flop has two stable states, the ON and OFF states sometimes referred to as the ONE and ZERO states. It can be set to one state or the other by short duration pulses applied to one input or the other, and remembers indefinitely the last state in which it has been set. A binary counter is similar to the flip-flop having two stable states and the property of remaining indefinitely in the state into which it was last thrown. By repeated application of a short duration pulse to its center binary count input terminal, it may be alternately thrown from one state to another. Thus, it divides the input pulse repetition rate by two. The addition of input terminals to each side of the binary counter, as shown, makes the counter into a combination device that can be set in either a ZERO or a ONE state before the train of pulses appears at the binary count input. A logical AND gate is a device with a multiplicity of input terminals and a single output terminal, which performs the logical operation of emitting a ONE signal in its output if all of its inputs are ONE. A logical OR gate has several inputs and one output. If any input is a logical ONE, then the output is also ONE. A one-shot multivibrator is used in the converter to provide in its output a pulse at the end of a predetermined delay interval which is used as a trigger to change the state of the following flip-flop.

The binary to decimal converter in accordance with the one modification of the invention shown in FIG. 1, comprises as the main elements: a source PG of continuously generated equal pulses, such as a generator or oscillator; an output AND gate AGO having one input fed from the pulse source PG; an output line OL including an amplifier and shaping network AS and a decade ring counter DRC, having sufficient capacity in decimal representation for the largest number to be converted, fed from the output of the output gate AGO; a flip-flop FF1 for controlling the output gate AGO, having an output connected to the other input of the output gate AGO, and two inputs; a plurality of AND input gates AG1, AG2, AG3, AG4, AG5 . . . each having a single output and two inputs one of which is fed from a source of binary-coded signals representing a different digit of a number to be converted; an equal number of series-connected binary counters BC1, BC2, BC3, BC4, BC5 . . . each having its ZERO input connected to the output of a different one of the input gates AG1, AG2, . . . and its second ONE input connected in parallel directly to a conversion starting circuit SC; an AND gate AG6 having a single output connected to the ZERO input of the flip-flop FF1, and a plurality of inputs respectively connected to the ONE output of a different one of the binary counters BC1, BC2, BC3, BC4, BC5 . . . ; and a circuit including an OR gate OG having its several inputs connected respectively to the output of a different one of the input gates AG1 AG2 . . . and its single output connected through a circuit including a delay generator DG, which may be a one-shot multivibrator, to the ONE input of the flip-flop FF1. The output of the output gate AGO is also connected to the center binary count input of the first binary counter BC1 in the series-connected binary counter chain.

The circuit of FIG. 1 also includes a number of auxiliary control elements including a plurality of other AND gates AG7, AG8, AG9, AG10 . . . respectively connected between the ZERO output of the series-connected binary counters BC1, BC2 . . . and the center binary count input of the next binary counter in the series. The operating condition of these auxilliary AND gates are controlled by a second flip-flop FF2 having its ONE output connected in parallel to the inputs of each of the AND gates AG7, AG8, AG9, AG10 . . . The ONE input of this second flip-flop FF2 is connected through the delay circuits DC2 and DC1 in series to the starting circuit SC and its ZERO input is connected to the output of the AND gate AG6.

Connected between the output of the delay generator DG and the ONE input of the flip-flop FF1 is a circuit including a third flip-flop FF3 followed by an AND gate AG11 and a delay circuit DC3. The ONE input of the flip-flop FF3 is connected to the output of the delay generator DG and its ONE output is connected to one input of AND gate AG11. The second input of AG11 is connected to the output of the pulse generator PG. The ZERO input of the flip-flop FF3 is connected to the output of the delay circuit DC3.

The converter circuit of FIG. 1 operates as follows. To aid in the description of operation explanatory waveforms illustrating the nature of the control signals at that point are shown at various points in the circuits of both FIGS. 1 and 2:

At the commencement of the conversion cycle, the flip-flop FF1 is in the OFF state so as to inhibit output gate AGO, thus preventing the continuous series of pulses from the generator PG from passing therethrough to the decade ring counter DRC in the output line OL.

The conversion cycle is initiated by a conversion start pulse applied to the starting circuit SC, which is applied directly to the ONE inputs of all the series-connected binary counters to clear them to the ONE operating condition. After passing through a delay circuit DC1 having a delay of a predetermined value sufficient to enable all the binary counters to settle down, the start pulse is applied in parallel to one input of each of the input gates AG1, AG2, AG3 . . . allowing the binary-coded signals representing the different digits of the number to be converted applied to the other inputs of these gates to pass through them only if the applied signal is a ONE, and no binary-coded signals to pass through any of the gates if the applied binary signal is a ZERO. The resulting pulses in the output of the input gates are applied directly to the ZERO input side of the flip-flops in the associated binary counters BC1, BC2 . . . This operation, therefore causes a binary complement of the number to be converted to enter into the binary counters.

The pulses in the output of the input gates AG1, AG2 . . . due to an applied input ONE signal are also applied to the inputs of the OR gate circuit OG and cause the triggering of a one-shot multivibrator delay generator DG in its output with a predetermined amount of additional delay, eventually to apply a pulse to the ONE input of the flip-flop FF1 turning it ON to open the output gate AGO. This allows a train of pulses from the pulse generator PG to be transmitted through that gate to the output line OL and to be applied through the amplifier and shaper device AS, which changes these pulses to the necessary square shape before being applied to the decade ring counter DRC, which will cause it to count up in decimal in well-known manner. Simultaneously, the train of output pulses are applied to the binary count terminal of the first binary counter BC1 in the series to cause the pulses in the train to be counted up in the counters until the outputs of all of the counters BC1 to BC5 reach the ONE state. This condition is detected by the AND gate AG6 which passes a pulse to the ZERO input of the flip-flop FF1 which again inhibits the output gate AGO preventing any further pulses from passing to the decade ring counter DRC in the output line OL and to the binary count input terminal of the binary counter BC1. The number of pulses allowed to pass into the output line OL and counted by the decade ring counter DRC therein, and counted up by the binary counters BC1, BC2 . . . represents in decimal form the binary number applied to the input of the converter.

The purpose of the AND gates AG7, AG8, AG9, AG10 . . . connected between each two successive binary counters in the series BC1, BC2 . . . is to prevent interference from one of these counters to the next while the counters are being set to the ONE state by the start pulse applied from the conversion starting circuit SC. The control flip-flop FF2 normally is in the OFF condition keeping the gates AG7 to AG10 closed until the setting in is completed, when the delayed starting pulse in the output of the delay circuit DC2 and DC1 in each conversion period applied to its ONE input turns this flip-flop ON to open these gates allowing binary counters BC1, BC2 . . . to operate in normal manner. The flip-flop FF2 is turned off at the end of the conversion operation by a pulse applied to its ZERO input from the output of the AND gate AG6 when all its inputs reach the ONE condition.

The circuit inserted between the output of the delay generator DG and the ONE input of the flip-flop FF1 is provided to take care of a synchronization problem, because the flip-flop FF1 might be turned on at any time and therefore gate a partial pulse from the pulse generator PG giving indeterminate operation by a count of one pulse. This circuit includes a third flip-flop FF3 which is turned ON by the delayed pulse in the output of the delay generator DG applied to its ONE input. This causes an input to be applied by the ONE output of FF3 to one input of the AND gate AG11 and the next good pulse from the generator PG applied to its other input to be gated out by the AND gate AG11 and shaped by the delay circuit DC3 to turn ON the flip-flop FF1, and at the same time to turn OFF the flip-flop FF3 by applying a pulse to its ZERO input. Once this process is started, it proceeds in a straightforward manner.

The second block diagram of FIG. 2 shows the conversion circuit arranged so that the binary number is entered into the binary counters in its true form and to so connect these counters that they count down to ZERO, which is detected by a gate connected to the output sides of the counters.

The arrangement of FIG. 2 differs from that of FIG. 1 in the following particulars: the binary counters BC1, BC2 . . . are connected in series by a connection from the ONE output of each counter to the binary count input of the next counter in the chain, instead of a connection from the ZERO output of each counter to the binary count input of the next counter as in FIG. 1; the outputs of the AND gates AG1, AG2, AG3 . . . are applied to the ONE inputs of the binary counters BC1, BC2 . . ., instead of to the ZERO inputs thereof as in FIG. 1, and the conversion start circuit SC is connected directly to the ZERO input side of all the binary counters BC1, BC2 . . . so that the starting pulse clears them all to the ZERO condition, instead of to the ONE condition as in the arrangement of FIG. 1. Also, the ZERO outputs of all the binary counters BC1, BC2 . . . are connected to respective inputs of the AND gate AG6 so that the pulses counted down in the binary counters to all ZEROS cause operation of that gate to turn OFF the flip-flop FF1, instead of having the ONE outputs of the counters connected to respective input terminals of the AND gate AG6 where the binary counters count down to all ONES as in the circuit of FIG. 1. This operation, therefore, causes the binary number in its true form to be converted to the decimal form.

Various modifications of the binary-to-decimal converter which has been illustrated and described which are within the spirit and scope of the invention will occur to persons skilled in the art.

What is claimed is:

1. In combination with a source of binary-coded signals respectively representing different digits of a number to be converted to decimal form, a circuit comprising an output line, means for continuously generating a series of equal pulses, an output gate connecting the output of said generating means to the output line, a chain of series-connected binary counter stages each having two stable states with separate inputs and outputs for each state and a binary count input, and control means responsive to a starting pulse initiating a conversion cycle to clear all of said counter stages to the same operating condition, means to cause the binary-coded signals representing the number to be converted to enter said binary counters, means responsive to the starting pulse with a predetermined delay to cause the opening of said output gate to allow a train of pulses from said generating means to pass to said output line and to the binary counter stages so as to be counted therein, and when the count causes the outputs of all of said counter stages to reach the same operated condition to close said output gate stopping the flow of the train of pulses to said output line and to said counter stages, the number of pulses counted by said chain of counter stages and passing to said output line in the conversion cycle representing the binary number at the input of said circuit, in decimal form.

2. The combination of claim 1, in which said binary counter stages are connected in series by a connection from the ZERO output of each stage to the binary input of the next stage, said starting pulse is applied directly to the ONE input of all of said binary counter stages to clear them to the ONE condition, and the output of said output gate is connected to the binary count input of the first stage of said chain so that a portion of the train of impulses appearing in the output of said output gate when it is opened are applied to the counter stages to start the counting thereby of the pulses in said train, and when said count causes the ONE outputs of all of said counter stages to reach the same operated condition said output gate to be closed to stop the flow of said train of pulses to said output line and series-connected binary counter stages.

3. In combination with a source of binary-coded zero or one signals representing different digits of a number to be converted to decimal form, a circuit comprising an output line, means for continuously generating a series of equal pulses, an output gate connecting the output of said generating means to said output line, a plurality of series-connected binary counters each having two stable states with separate inputs and outputs for each state and a binary count input, an equal number of normally-disabled input gates respectively connecting the binary-coded signals from said source representing different digits of said number to the corresponding input of a different one of said counters, means responsive to a starting pulse initiating a conversion cycle to first clear all of said counters to the same operating condition, means responsive to the starting pulse with a predetermined amount of delay to enable certain of said input gates so that they transmit to said counters the applied binary-coded signals from said source of the same binary signal type so as effectively to enter said number into said counters, means also responsive to the starting pulse with a predetermined additional amount of delay to cause said output gate to be opened to allow a train of said equal pulses to pass to said output line, and to said counters so as to be counted therein, and means responsive to the outputs of said counters when all reach the same operated condition to cause said output gate to be closed to stop the flow of said train of pulses to said output line and to the input of said counters, the number of pulses passing to said output line and counted by said counters during a conversion cycle representing in decimal form the binary-coded number applied to the input of said circuit.

4. A binary-to-decimal converter comprising in combination with a source of binary-coded signals representing different digits of a number to be converted to decimal form, an output line, a generator for continuously generating a series of equal pulses, a normally-disabled output gate connecting the output of said generator to said output line, flip-flop means for controlling the operating condition of the output gate, a chain of series-connected binary counters each having two stable operating states with separate inputs and outputs for each state and a binary count input, an equal number of input gates respectively connecting the signals from said source representing different digits of said number to the corresponding input of a different binary counter, means responsive to a starting signal initiating a conversion cycle for first setting all of said counters to the same operating condition, means responsive to the starting signal with a predetermined amount of delay for conditioning said input gates so that they allow only the binary-coded signals of the same binary type to be transmitted to the inputs of the binary counters, thereby effectively entering the number to be converted in the counters, control means including other gating means, also responsive to a starting pulse with a predetermined amount of additional delay to condition said flip-flop means so that it opens said output gate to allow a train of pulses to be transmitted to said output line, and to the series-connected counters causing them to count the pulses in the train until all of the binary counters reach the same output condition and a third gate responsive to that condition to control said flip-flop means so that it inhibits said output gate stopping the flow of the train of pulses to said output line and to said counters, the number of the pulses in the train for the conversion cycle counted by said counters and entering said output line representing the binary number applied to the input of said converter, in decimal form.

5. The converter of claim 4, in which said output gate, said input gates and said third gate are normally-disabled AND gates, which are enabled in response to said starting pulse and to said same output condition of said counters, respectively, and said means for opening said output gate includes an OR gate and a delay generator triggered thereby with a predetermined amount of delay in response to the output of any of said input gates to switch said flip-flop means to the ON condition.

6. The converter of claim 4, in which said binary counters are connected in series by a connection between the ZERO output of each counter and the binary count input of the succeeding counter in said chain, said control means include a plurality of other AND gates which are respectively connected between each two of said binary counters and a second flip-flop for controlling their operation to prevent interference from one counter to the next while they are being set to the same operating condition in response to the starting pulse, said other AND gates being kept closed until the setting is completed, in response to the normal OFF condition of said second flip-flop means, said second flip-flop means being operated to the ON condition when said setting is completed to cause these other AND gates to be turned ON by a delayed starting pulse, thus allowing the binary counters to operate in the normal manner, said second flip-flop means being turned OFF in response to the operation of said third gate by the outputs of all said binary counters reaching the same condition.

7. The converter of claim 4, in which a second flip-flop means followed by a fourth gating means controlled thereby and a delay circuit are inserted in the connection between said control means and the first flip-flop means, said second flip-flop means being turned ON in response to a delayed starting pulse to cause the output of said fourth gating means through said delay circuit to turn ON said first flip-flop means to open said output gate and to turn OFF said second flip-flop means, in order to prevent false operation of said output gate by a count of one pulse only.

8. A binary-to-decimal converter comprising in combination with a source of binary-coded signals presenting either ZERO or ONE signals representing a number to be converted to decimal form, means for continuously generating a series of equal pulses, an output line, an output gate feeding said line and fed by said pulse generating means, a flip-flop for controlling said output gate, which is normally in the OFF condition so as to inhibit said output gate and prevent transmission therethrough of the generated pulses to said line, a plurality of series-connected binary counters having stable ZERO and ONE states with separate inputs and outputs for each state and a binary count input, an equal number of normally-disabled input gates respectively coupling different binary signals from said source representing different digits of said number to the input of a different one of said binary counters, means for initiating the conversion cycle by a starting pulse which is first applied to an input of each of said binary counters to clear them all to the ONE condition, means responsive to the starting pulse for applying it with a predetermined amount of delay to said input gates to render them operative and to cause a pulse to pass through only those gates having a ONE binary signal applied thereto to the ONE input of the associated binary counter resulting in the binary complement of the number to be converted to be effectively entered into the binary counters, means responsive to the starting pulse with an additional predetermined amount of delay to set said flip-flop to the ON condition causing said output gate to be opened to allow transmission therethrough to said output line of a train of the generated pulses from said generating means, and simultaneously to pass to and to be counted up in said series-connected binary counters, other gating means responsive to the outputs of said binary counters when they all reach the ONE condition to cause said flip-flop to be disabled to again inhibit said output gate and prevent transmission therethrough to said line, and to said binary counters of further pulses in the train from said generating means, the pulses counted in said train for the conversion cycle by said binary counters and supplied to said output line representing in decimal form the number represented by said binary coded signals.

9. A circuit for converting a number in pure binary code to the decimal form comprising a plurality of input AND gates each having a single output and two inputs one of which is supplied with a binary ZERO or ONE signal representing a different digit of the number to be converted, an equal number of series-connected binary counters each having an output and a plurality of inputs one of which is respectively connected to the output of a different one of said input gates, means for continuously generating a series of equal pulses, an output line, an output AND gate feeding said output line and having one input fed with the continuously generated pulses from said generating means, a flip-flop for controlling said output gate which is normally in the OFF condition so as to inhibit said output gate and prevent said series of pulses from passing therethrough to said output line, means for initiating the conversion cycle by a start pulse which first is applied to another input of each of said binary counters to clear them all to the ZERO condition and then with a predetermined amount of delay to the other input of each of said input gates causing their operation to pass the applied binary coded signal to its single output only if it is a ONE and no pulse to pass if the applied binary-coded signal is a ZERO, means for causing the resulting output pulses of said input gates to pass to said one input of said binary counters causing said number in pure binary form to be entered therein, means responsive to the starting pulse after an additional predetermined amount of delay to cause said flip-flop to be turned ON to open said output gate so as to allow the continuously generated pulses to be passed therethrough to said output line, and simultaneously to pass to and be counted up in said series-connected binary counters, another AND gate having its single output connected to the input of said flip-flop and a plurality of outputs respectively connected to the ONE output of a different one of said binary counters and responsive thereto when all of them pass a ONE output signal to shut off said flip-flop to again inhibit said output gate and stop the transmission of said series of pulses to said output line, the number of pulses passing to said output line during a conversion cycle representing said binary number in decimal form.

10. The circuit of claim 9, in which said means to cause said flip-flop to be turned ON comprises an OR gate having a plurality of inputs respectively connected to the output of each of said input AND gates and a one-shot delay generator triggered in response to an output from any one of said input gates produced therein after the starting pulse has conditioned them for operation, to apply an input to said flip-flop to set it to the ON state after a short amount of additional delay to allow said binary counters to settle down.

References Cited by the Examiner

UNITED STATES PATENTS

| | | | |
|---|---|---|---|
| 2,928,600 | 3/60 | Fleming | 340—347 |
| 2,929,556 | 3/60 | Hawkins et al. | 340—347 |
| 2,945,221 | 7/60 | Hinton et al. | 340—347 |

MALCOLM A. MORRISON, *Primary Examiner.*